United States Patent [19]

Beer et al.

[11] Patent Number: 4,787,323
[45] Date of Patent: Nov. 29, 1988

[54] TREATING SLUDGES AND SOIL MATERIALS CONTAMINATED WITH HYDROCARBONS

[75] Inventors: Gary L. Beer; Ying H. Li, both of Plano, Tex.

[73] Assignee: Atlantic Richfield Company, Los Angeles, Calif.

[21] Appl. No.: 84,641

[22] Filed: Aug. 12, 1987

[51] Int. Cl.$^4$ .............................................. F23G 7/04
[52] U.S. Cl. .................................... 110/346; 34/183; 110/220; 110/227; 110/238
[58] Field of Search ............... 110/237, 238, 228, 218, 110/219, 220, 224, 226, 227, 215, 216, 217, 346; 34/182, 183

[56] References Cited

U.S. PATENT DOCUMENTS

| | | | |
|---|---|---|---|
| 3,800,865 | 4/1974 | Onarheim et al. | 34/183 X |
| 3,996,892 | 12/1976 | Besik et al. | 110/238 X |
| 4,063,903 | 12/1977 | Beningson et al. | 110/220 X |
| 4,354,317 | 10/1982 | Mathis et al. | 34/182 X |
| 4,402,274 | 9/1983 | Meenan et al. | 110/237 X |
| 4,516,511 | 5/1985 | Kyo | 110/227 X |
| 4,571,175 | 2/1986 | Bogle et al. | 110/238 X |

*Primary Examiner*—Steven E. Warner
*Attorney, Agent, or Firm*—Michael E. Martin

[57] ABSTRACT

Oily sludges containing volatile hydrocarbons are mixed with diatomaceous earth or perlite in a system which includes an indirect dryer for vaporizing liquids have a boiling point of less than about 700° F. Dried solids are discharged from the dryer and conveyed to an oxidation unit comprising a rotary kiln or lift pipe combustor. Dried hydrocarbon free solids are recirculated for mixing with the oily sludge and condensable vapors are condensed and separated for further use or disposal. A system including the indirect dryer, condenser, oxidation unit, separators for the condensate and separators for gaseous products can be modified to receive hydrocarbon contaminated soils and other earth-like materials having particle sizes ranging from as low as 10 microns up to about 1.0 inches.

21 Claims, 2 Drawing Sheets

TREATING SLUDGES AND SOIL MATERIALS CONTAMINATED WITH HYDROCARBONS

BACKGROUND OF THE INVENTION

1. Field of the Invention

The present invention pertains to a method and system for treating sludges containing water, oils, and solids by a thermal drying and combustion process and including the addition of solid materials to the sludge. The process is also adapted for handling solids such as earth materials contaminated with hydrocarbon substances.

2. Background

There are several sources of oil sludges that develop in the production, transport and refining of hydrocarbon materials such as crude oil. Certain refinery processes and transport processes produce sludges comprising primarily water, crude oil and various solid fines such as scale, clay and sand. The solids can be small in size, such as in the range from 1 to 10 microns, and are thus difficult to separate from the oil and water through conventional separation process, including filtration or solvent extraction processes.

The aforementioned types of sludges are often difficult to handle by conventional waste treatment techniques since the various fractions of the crude oil may be volatile or tend to form coke or tar-like materials when subjected to prior art treatment processes. The material handling properties of tanker ballast sludges and refinery waste sludges, for example, interfere with the transfer of heat, resulting in clinkering or incomplete distillation and combustion.

A related problem in the handling of hydrocarbons in disposal and waste treatment processes pertains to earth-like materials which become contaminated with hydrocarbon substances, such as crude oils or partially or completely refined petroleum products. The decontamination of soils which have been subject to leakage from storage tanks, oil spills and other mishaps, presents at least two major interrelated problems, namely the effective removal of the hydrocarbons from the soil due to the wide range of properties hydrocarbons can exhibit when mixed with different soils and the dangers associated with treating the hydrocarbon substance depending on its volatility.

The present invention provides a process and system which is useful in treating oil sludges containing hydrocarbons of both naturally occurring crude petroleum and the like, as well as refined or partially refined petroleum products, which process and system is also adaptable to and advantageous for treating soils and other earth-like materials which have been contaminated or mixed with hydrocarbons.

SUMMARY OF THE INVENTION

The present invention provides an improved process and system for treating hydrocarbon materials in the form of oily sludges or soils and other earth-like materials which have been contaminated with primarily liquid hydrocarbons.

In accordance with an important aspect of the present invention, oily sludges such as those resulting from tanker ballast water treatment and storage tank residues, as well as refinery waste streams are subjected to a thermal process in combination with solids to form a thickened, flowable mixture which may be treated by a specialized dryer to evaporate water and low boiling point or volatile hydrocarbon materials. The mixing and drying steps are followed by a combustion process to oxidize the remaining hydrocarbon materials mixed with the solids.

In accordance with another aspect of the present invention, oily sludges having a low solids content are mixed with solids materials having high surface area and porosity characteristics such as diatomaceous earth and perlite prior to subjecting the thickened sludge or oil, water and solids mixture to a thermal drying process and an oxidation process, whereby the liquids present in the sludge are driven off as vapors, condensed and separated into treatable or usable fractions, and the remaining solids are incinerated to oxidize the remaining hydrocarbons and provide solids materials which may be recycled in the process and are suitable for conventional disposal techniques.

The present invention also contemplates the treatment of soils or other earth-like materials which have become contaminated with hydrocarbons utilizing the basic process and system of the present invention.

The abovementioned aspects of the present invention, as well as other superior features and advantages thereof will be further appreciated by those skilled in the art upon reading the detailed description which follows in conjunction with the drawing.

DESCRIPTION OF PREFERRED EMBODIMENTS

Figure 1:
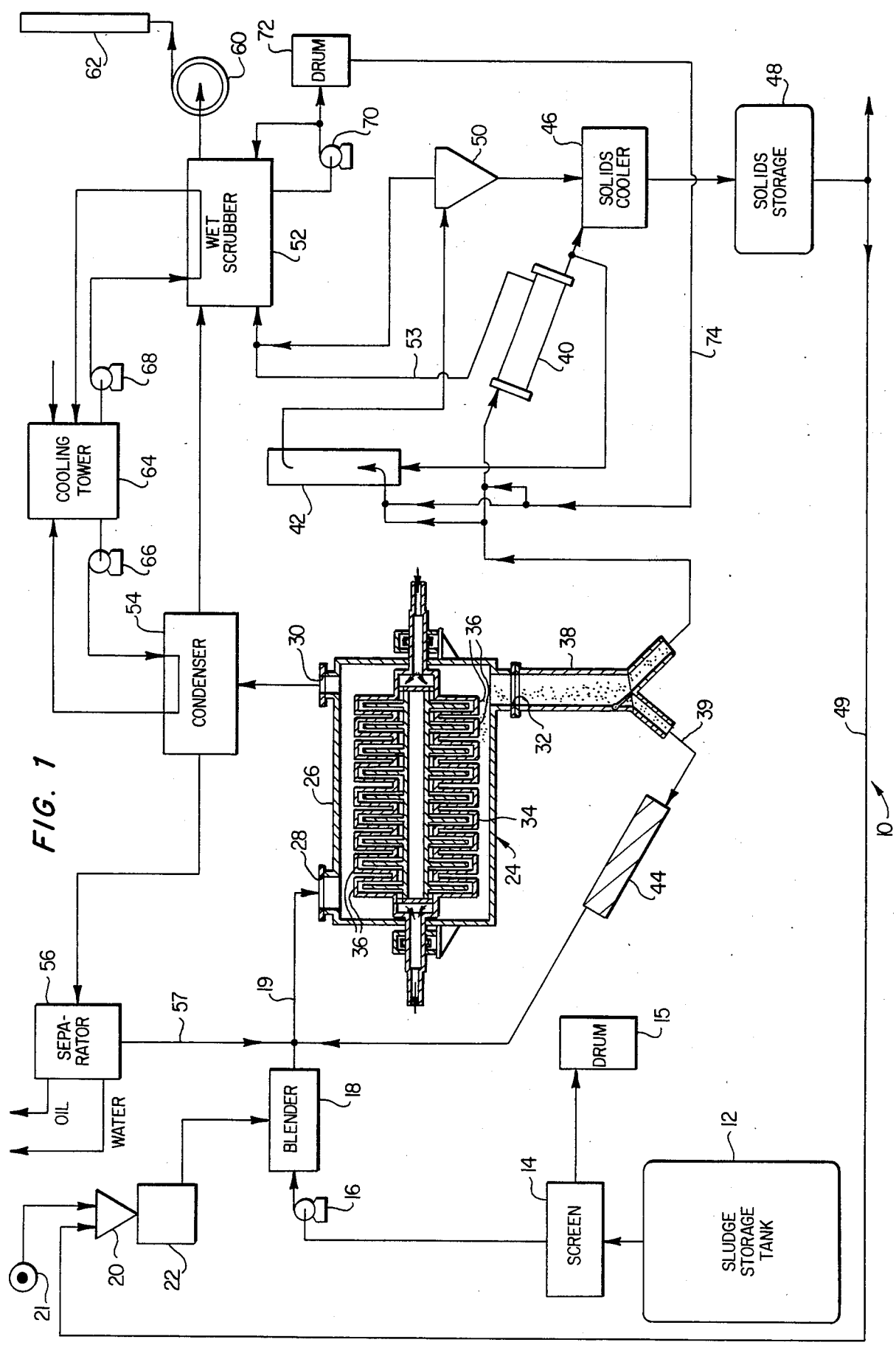
FIG. 1 is a schematic diagram of a system for treating oily sludges in accordance with the present invention.

In the description which follows, like parts are marked throughout the specification and drawing with the same reference numerals, respectively. The drawing figures are in schematic form and certain conventional components are illustrated in accordance with accepted standard symbols for such components.

The very large scale movement of crude oil through transport systems including pipelines, storage tanks and marine tankers has given rise to the problem of disposing of certain sludges which collect in the bottoms of storage tanks, result from pipeline cleanout operations and are collected in the treatment of marine tanker ballast water. Certain petrochemical processes also produce sludges which comprise water, crude or partially refined petroleum and certain solids which may or may not be in suspension with an emulsion of the water and petroleum. One particularly vexatious problem involves dealing with the sludge which accumulates from the treatment of marine tanker ballast water. This sludge contains water, crude oil and a certain amount of fine silt, sand and metal scale or rust. Conventional separation processes have not been particularly successful for dealing with this type of material and environmental regulations require that the material be treated only in specialized facilities which are costly to provide, including transportation charges for moving the sludge material to an acceptable disposal site. Certain improvements in the treatment of oily drill cuttings and refinery waste streams have been developed, such as those systems disclosed in copending U.S. patent applications Ser. No. 796,349 to James L. Skinner and Ser. No. 944,644 to Gary L. Beer and Ying H. Li, both applications being assigned to the assignee of the present invention. The processes disclosed in these applications utilize a dryer or dehydrator apparatus which is capable of handling a mixture of oily waste, including water, and a relatively high concentration of solids, having a consistency not unlike mud. The present invention also utilizes a dryer apparatus of the type suggested in the abovementioned patent applications, and includes further steps and system features which are particularly adapted for handling oily sludges in a unique manner heretofore unappreciated by the prior art.

One particular problem in dealing with sludges containing crude oil and other hydrocarbons having a relatively broad range of specific hydrocarbon compounds pertains to applying thermal techniques without incurring the hazards associated with volatile hydrocarbons or without incurring the formation of coke-like materials or "clinkering" normally associated with the thermal treatment of heavy hydrocarbons. Whether or not these hydrocarbon materials are present in a watery or liquid sludge or have soaked into soils or other earth-like materials, several important features of the method and system of the present invention permit treatment of these wastes or contaminated substances in such a way that condensable liquids are recovered, combustion processes convert at least a significant portion of the remaining hydrocarbons to environmentally acceptable combustion products and solids materials are reduced to those which may be recycled in the process or more easily disposed of.

Referring to FIG. 1, there is illustrated a system 10 which is particularly adapted for handling oily sludges which may be kept in a storage tank or pond 12. The system 10 includes means for withdrawing the sludge from the storage means 12 including a filter screen apparatus 14 and a pump 16 for delivering filtered sludge to a mechanical blender 18. Oversize particles screened by the filter screen 14 may be at least temporarily stored in a drum 15. The blender or mixer 18 may be of the so-called ribbon type or of a type having parallel shafts with mixing paddles mounted thereon for thoroughly mixing the sludge with a solid, such as an earthlike material, including diatomaceous earth and perlite. The blender 18 is adapted to receive a predetermined flow rate of diatomaceous earth or perlite from a supply source of such material including a hopper 20 and a suitable feed mechanism 22. Any makeup solids required are input to the hopper 20 through a supply conduit 21.

The somewhat watery sludge pumped to the blender 18 from the storage tank 12 is thus mixed with the diatomaceous earth, perlite or similar earth-like materials having a high porosity and surface area or absorption capability to form a substantially thickened sludge or mud-like material which is flowable and may be pumped to the inlet of a dryer apparatus generally designated by the numeral 24. The dryer 24 is preferably of the rotating disk type having an outer housing 26 with an inlet 28, a vapor discharge outlet 30 and a solids material outlet 32. One type of dryer 24 which is particularly advantageously used in the process, and the system 10 is manufactured under the trademark "TORUS-DISC" by Bepex Corporation, Minneapolis, Minn. The dryer apparatus 24 includes a rotor 34 having a plurality of spaced apart cylindrical disks 36 which are hollow and permit the circulation of a heated fluid therethrough between inlet and discharge ports at opposite ends of the rotor. Heated fluid, such as oil, may be circulated through the interior of the rotor 34 to provide a heat transfer medium for heating material which is discharged into the interior of the housing 26 through the inlet 28. The dryer 24 provides a sufficient amount of heat for treating the thickened sludge or soil mixture discharged into its interior in such a way that substantially dehydrated material is discharged through a conduit 38 to a heavy hydrocarbon oxidation means including a rotary kiln 40 and, if required, a fluidized bed combustor or lift pipe type combustor 42 disposed downstream of the kiln 40. Depending on the material load and the particle size of the dried solids discharged from the dryer 24, either the kiln alone or the lift pipe type afterburner or oxidation unit 42 alone may be utilized in oxidizing those hydrocarbons which have not been vaporized as the material moves through the dryer 24.

A sufficient amount of diatomaceous earth, perlite or similar absorptive material is supplied to be blended with the sludge in the blender 18 such that upon drying or distilling the material put through the dryer 24, dried solids having the consistency and appearance of ground coal are discharged through the conduit 38. It is indicated that weight ratios of diatomaceous earth to sludge in the range of 1:6.4 to 1:1.3 may be processed by the dryer 24 to produce a friable solids mixture which can be combusted to yield friable, carbon free solids. In order to adjust the consistency of the mixture entering the dryer 24, at least a portion of the dried solids discharged through the conduit 38 may be recirculated through a bypass conduit 39 and a suitable conveyer 44 back to the dryer inlet conduit 19 for mixing with the thickened sludge entering the dryer from the blender 18. In this way, the composition of the material being treated by the dryer 24 is easily adjusted. The material discharged into the oxidation means, including the kiln 40, is suitably heated to oxidize the hydrocarbons remaining in mixture with the solids materials and the hydrocarbon free solids are then discharged into a cooling apparatus 46, whereby the solids may be exposed to a water spray or the like to suitably cool the solids to a temperature at which they may be held in suitable storage means 48 and either discharged for disposal or recycled back to the material feed hopper 20 by way of a suitable conduit 49. Material from the dryer 24 which is discharged through the lift pipe type oxidation or combustion unit 42 is conveyed therethrough by pressure air from a source, not shown, and discharged into a separator 50, which may be a cyclone type separator, as shown, and whereby the gaseous products of combustion are then discharged into a suitable scrubber 52. Gases from the rotary kiln 40 may also be discharged to the scrubber 52 by way of a conduit 53. Solids separated in the cyclone separator 50 is preferably discharged into the cooler 46 for treatment to reduce its temperature before recycling through the conduit 49 or other suitable handling.

The vapors of water and more volatile hydrocarbon fluids generated in the dryer 24 are discharged therefrom to a condenser 54, wherein the water vapor and those hydrocarbon fluids which will condense readily are liquefied and conducted to a separator 56 for separation of the oil and water for discharge from the separator and further treatment if necessary. The separator 56 is preferably of a settling type, wherein any solids fines which are entrained with the condensed fluids and conveyed to the separator will settle out and may be recirculated through a conduit 57 back to the inlet conduit 19 for retreatment by the dryer 24. Fluids, primarily air, not readily condensable, but discharged from the condenser 54 are also conveyed to the scrubber 52. The scrubber 52 is continually evacuated to maintain a balance of fluid flow by a fan 60 which discharges combustion products comprising primarily carbon dioxide, and the air conveyed from the condenser 54 through a suitable discharge stack 62.

The condenser 54 and the wet scrubber 52 are both cooled by a cooling water circulating system including a cooling tower 64 and water circulating pumps 66 and 68 which circulate cooling water to the condenser 54 and the scrubber 52, respectively. The wet scrubber 52 may be configured to provide a direct contact water spray for quenching the hot gases being discharged into the scrubber. Any solids fines which are removed from the gas stream passing through the scrubber 52 are circulated by a pump 70 to a sludge collection drum 72. The contents of the drum 72 may be circulated back through a conduit 74 to the inlet of the oxidation means comprising either the kiln 40, the lift pipe 42 or a combination of the two elements connected in parallel or series as required for the particular process. If the sludge being collected in drum 72 is particularly watery or of low solids content the system may be modified to conduct sludge from drum 72 to the blender 18 or the inlet to the dryer 24.

The system 10 and the process of treating oily sludges using the system contemplates providing for partial recovery of hydrocarbons having a boiling point below about 600° F. to 700° F. in the dryer 24 with the residual hydrocarbons and the dried solids then being conducted to the oxidation units 40 and/or 42 for complete oxidation so that the remaining solids are suited for conventional disposal or may be recycled for use in the process. Thanks to the use of the dryer 24, solid particles ranging from sizes normally measured in microns up to particles of approximately one inch maximum dimension may be handled with the sludge mix.

Moreover, with the backmixing conveyor 44 and the conveyance of fines from the conduit 57 to the conduit 19, the consistency of the sludge mixture entering the dryer 24 may be easily controlled to prevent accumulations of heavy hydrocarbons in the dryer in the form of coke or tar-like substances on the dryer heat transfer surfaces. Thus the heat transfer efficiency of the dryer is maintained at a high level. By adding a porous media such as diatomaceous earth or perlite into the sludge prior to the thermal drying, a friable, dried product is discharged into the conduit 38 which is easily handled and more easily oxidized at an oxidation temperature of up to about 1800° F. in either the rotary kiln unit 40, the lift pipe oxidation unit 42, or a combination of the two units.

The following nonlimiting example is illustrative of the process of the invention.

EXAMPLE 1

A 100 gram sample of oil sludge containing about 40% crude oil, 48% water and 12% solids was mixed with 16 grams of diatomaceous earth. The mixture was then dried at 500° F. for one hour to yield 56 grams of friable solids. These solids were subsequently burned in a furnace with air at 1800° F. for about one hour yielding 28 grams of friable, carbon free solids.

Figure 2:
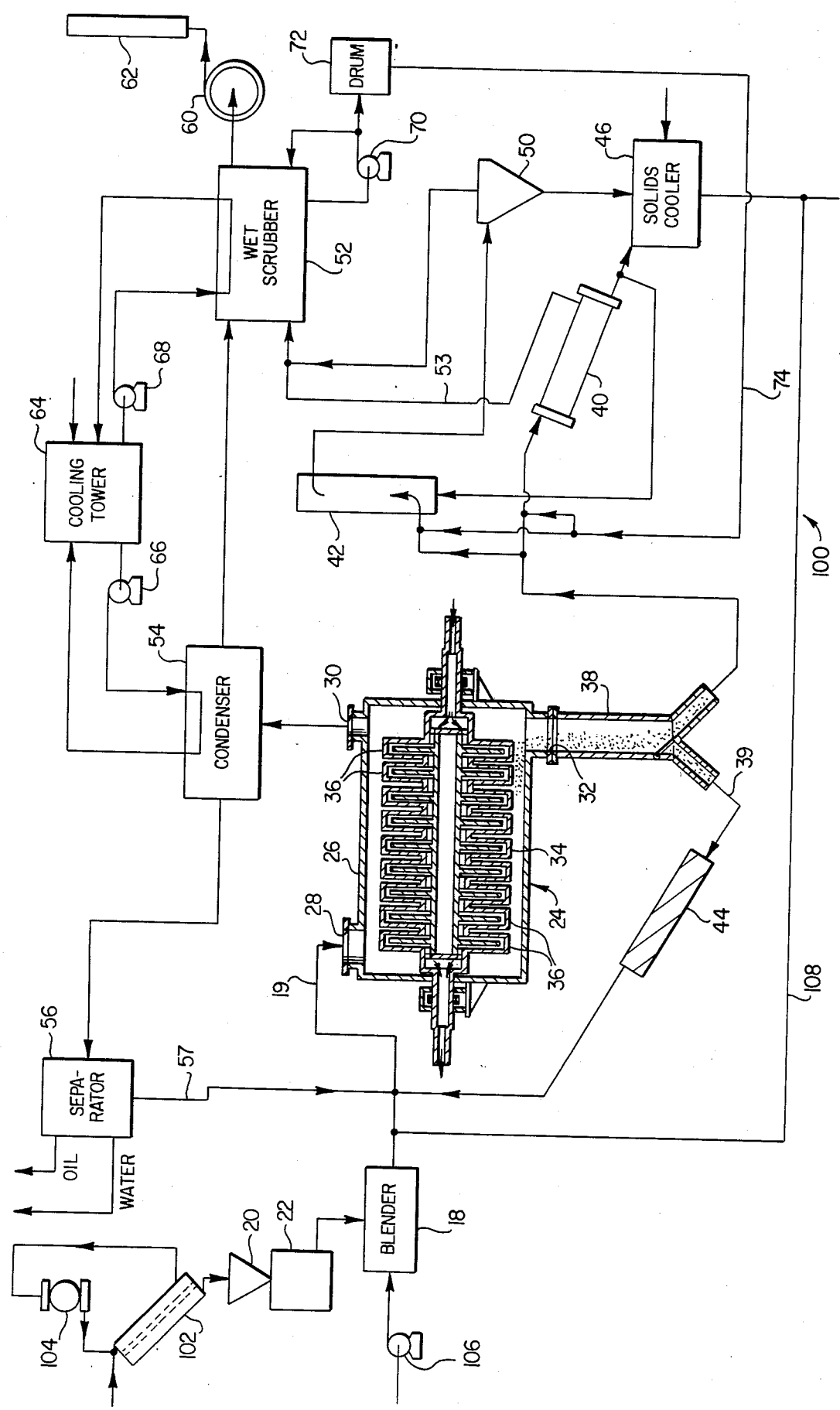
FIG. 2 is a schematic diagram of a similar system for treating soil materials contaminated with hydrocarbon substances.

Referring now to FIG. 2, there is illustrated a modification of the system 10 and which is generally designated by the numeral 100. The system 100 is similar in several respects to the system 10, as indicated by the schematic diagram, but is adapted primarily to handle soils and similar earthlike materials which have been contaminated with hydrocarbon fluids. In many situations of leakage or spillage of hydrocarbons such as crude oil and refined products, soil and other earth materials are contaminated. Conventional treatment processes involve identification of the contaminated area, followed by excavation of the contaminated soil and removal to a suitable landfill. Regulations concerning the use of landfill disposal of soils or other solids contaminated with hydrocarbon substances now largely prevent this type of decontamination process. Although some earthlike materials are easily separated from some hydrocarbon substances, the ideal combinations are rarely found. However, the system for treating sludges illustrated in FIG. 1 can be modified in accordance with the diagram of FIG. 2, generally, to provide a system and method for treating contaminated soils. FIG. 2 illustrates a system for treating contaminated soils for supply to the dryer 24 by way of the blender 18, the hopper 20, the feeder 22 and a screener 102. Contaminated soil is introduced to the screener 102 so that oversized particles are prevented from entering the system and damaging the system components, including the aforementioned components. Oversized particles may be processed for suitable screening by a grinder 104 and reintroduced to the screener so that properly size limited particles are introduced to the hopper 20 and the blender 18. If the soil is too dry for effective conveyence to the dryer 24, it may be fluidized in the blender 18 by introducing water from a pump 106 to the blender so that a suitably conveyable mixture of a thickened sludge or mud-like consistency is introduced to the dryer 24.

The soil contaminated with hydrocarbon liquids and water is processed through the dryer 24, the oxidation units 40 and/or 42 and the cooler 46 for discharge to a suitable disposal site, which may be the excavation site, and a portion of the decontaminated soil may be returned to the inlet conduit 19 by way of a conduit 108. The handling of the vapors from dryer 24 is identical to that in which the system of FIG. 1 is configured. Accordingly, soils and similar earth solids contaminated with crude oils and refined petroleum products may be treated by the drying and oxidation process of the system illustrated in FIG. 2, wherein substantially hydrocarbon free solids material is discharged from the system and the hydrocarbon substances which have a boiling point below about 600° F. to 700° F. are vaporized in the dryer 24 and condensed and recovered in the condenser 54 and separator 56. Those hydrocarbon substances mixed with the dried soil exiting from the dryer 24 may be subjected to an oxidation process and recovered in the same manner that the solids are treated in the process and system of FIG. 1.

Although preferred embodiments of processes and systems in accordance with the present invention have been described herein in detail, those skilled in the art will recognize that various substitutions and modifications may be made to the specific processes and systems shown and described without departing from the scope and spirit of the invention as recited in the appended claims.

What we claim is:

1. A system for treating oily sludges containing small amounts of solids, wherein said oily sludges are primarily a flowable liquid mixture, said system comprising:
   dryer means including an inlet, a vapor outlet and a solids discharge outlet;
   oxidation means in communication with said solids discharge outlet for receiving dried solids and for combusting hydrocarbons remaining on said dried solids to provide substantially hydrocarbon free solids;
   a source of solids material having a particle size which averages about one inch or less and having a relatively high liquid absorptive capacity;
   means for mixing said oily sludge with said solids and for conveying a mixture of said oily sludge and said solids in the form of a substantially thickened sludge to said inlet of said dryer means;
   and condenser means connected to said vapor outlet of said dryer means for receiving vapors of said oily sludge from said dryer means;
   said system being operable to convey a thickened sludge comprising said oily sludge and a quantity of said solids to said dryer means for evaporation of liquid hydrocarbons and other liquids in said dryer means at a temperature of less than about 700° F., to convey vapors generated in said dryer means to said condenser means, to discharge substantially dried solids to said oxidation means and to discharge substantially hydrocarbon free solids from said oxidation means to means for receiving said solids.

2. The system set forth in claim 1 including:
   means in communication with said solids discharge outlet for conveying a portion of dried solids being discharged from said dryer means back to said inlet for mixing with the sludge mixture entering said dryer means to modify the composition of said mixture entering said dryer means.

3. The system set forth in claim 1 including:
   separator means in communication with said condenser for receiving condensate from said condenser including solids fines, and means for conveying said solids fines to said inlet to be mixed with the sludge mixture entering said dryer means.

4. The system set forth in claim 1 wherein:
   said oxidation means comprises a rotary kiln for receiving dried solids and for discharging substantially hydrocarbon free dried solids for recycling through said mixing means and said dryer means.

5. The system set forth in claim 1 wherein:
   said dryer means comprises a rotary disk indirect dryer.

6. The system set forth in claim 1 including:
   means for conveying substantially hydrocarbon free solids discharged from said oxidation means back to said source of solids for mixing with said oily sludge.

7. The system set forth in claim 1 or 6 wherein:
   said solids comprise diatomaceous earth.

8. The system set forth in claim 1 or 6 wherein:
   said solids comprise perlite.

9. The system set forth in claim 1 including:
   means for receiving oxidation products from said oxidation means including first separator means for separating solids from gaseous oxidation products and means for discharging said solids to mix with solids discharged from said oxidation means.

10. The system set forth in claim 9 including:
    second separator means for receiving noncondensable fluids from said condenser and for receiving gaseous oxidation products from said first separator means and for separating any remaining solids entrained with said gaseous oxidation products and said noncondensable fluids emitted from said condenser, and means for returning said solids separated in said second separator means to one of said dryer means and said oxidation means.

11. The system set forth in claim 9 wherein:
    said oxidation means comprises a lift pipe for combusting said solids and discharging hydrocarbon free dried solids to said first separator means.

12. A system for treating soil and other solids earth material contaminated with hydrocarbon fluids, said system comprising:
    dryer means including an inlet, a vapor outlet and a solids discharge outlet;
    oxidation means in communication with said solids outlet for receiving dried solids and for combusting hydrocarbons remaining on said dried solids to provide substantially hydrocarbon free solids;
    means for screening said solids to provide a feedstream having a particle size which averages about one inch or less;
    condenser means connected to said vapor outlet of said dryer means for receiving vapors from said dryer means;
    means for conveying at least a portion of said solids which have been discharged from said dryer means back to said inlet for mixing with the solids entering said dryer means to adjust the composition of said mixture entering said dryer means; and
    said system being operable to convey said solids to said dryer means for evaporation of liquid hydrocarbons and other liquids in said dryer means at a temperature of less than about 700° F., convey vapors generated in said dryer means to said condenser means and to discharge substantially dried solids to said oxidation means and to discharge substantially hydrocarbon free solids from said oxidation means to means for receiving said solids.

13. The system set forth in claim 12 including:
    means for mixing said solids with a liquid to form a sludge for introduction into said dryer means.

14. The system set forth in claim 12 wherein:
    said dryer means comprises a rotary disk indirect dryer.

15. A method for treating sludges containing liquid hydrocarbons and solids fines coated with said liquid hydrocarbons comprising the steps of:
    providing indirect rotary dryer means having an inlet, a vapor outlet and a solids discharge outlet;
    providing means in communication with the inlet of said dryer means for mixing said sludge with a quantity of solids selected from a group comprising diatomaceous earth and perlite to provide a thickened sludge to said dryer means;
    mixing said sludge with said solids to provide a thickened sludge and conveying said thickened sludge to said dryer means;
    heating said thickened sludge in said dryer means to a maximum temperature of about 700° F. to vaporize hydrocarbon fluids and other fluids in said dryer means;
    condensing said vapors of said hydrocarbon fluids to provide recoverable liquid hydrocarbons;

conducting dried solids from said dryer means and exposing said dried solids to oxidation means for oxidizing hydrocarbons coated on said dried solids; and disposing of said dried solids which are substantially hydrocarbon free.

16. The method set forth in claim 15 including the step of:

returning at least a portion of dried solids before oxidation to said inlet to provide at least a portion of said solids for thickening said sludge.

17. The method as set forth in claim 15 including the step of:

conveying hydrocarbon free and dried solids from said oxidation means to said dryer inlet to provide at least part of said solids for thickening said sludge.

18. The method set forth in claim 17 including the step of:

mixing said solids prior to introducing said solids to said dryer means with a liquid to provide a thickened sludge for introduction to said dryer means.

19. A system for treating soil and other solids earth material contaminated with hydrocarbon fluids, said system comprising:

dryer means including an inlet, a vapor outlet and a solids discharge outlet;

oxidation means in communication with said solids outlet for receiving dried solids and for combusting hydrocarbons remaining on said dried solids to provide substantially hydrocarbon free solids;

means for screening said solids to provide a feedstream having a particle size which averages about one inch or less;

condenser means connected to said vapor outlet of said dryer means for receiving vapors from said dryer means;

separator means in communication with said condenser means for receiving condensate from said condenser means including solids fines; and means for conveying a sludge of said solids fines to said inlet to be mixed with the mixture entering said dryer means;

said system being operable to convey said solids to said dryer means for evaporation of liquid hydrocarbons and other liquids in said dryer means at a temperature of less than about 700° F., convey vapors generated in said dryer means to said condenser means and to discharge substantially dried solids to said oxidation means and to discharge substantially hydrocarbon free solids from said oxidation means to means for receiving said solids.

20. A method for decontaminating soils and other solids earth-like materials to remove hydrocarbon substances therefrom comprising the steps of:

providing rotary indirect dryer means including an inlet, a vapor outlet and a solids discharge outlet;

reducing the particle size of said soil to an average of about one inch or less and introducing said reduced soil to said dryer means and heating said reduced soil to a maximum temperature of about 700° F. to vaporize hydrocarbon fluids and other low boiling temperature fluids present in said soil;

conducting vapors of said hydrocarbon fluids away from said dryer means and condensing said hydrocarbon fluids; and discharging dried and heated solids of said reduced soil from said dryer means and combusting said solids to oxidize hydrocarbons remaining coated on said solids to provide substantially hydrocarbon free solids for disposal.

21. The method set forth in claim 20 including the step of:

mixing said reduced soil with a liquid prior to introducing said reduced soil to said dryer means to provide a thickened sludge for introduction to said dryer means.

* * * * *